Feb. 27, 1968  R. H. MAYER, JR  3,370,683
FLEXIBLE CHUTING
Filed Jan. 26, 1966
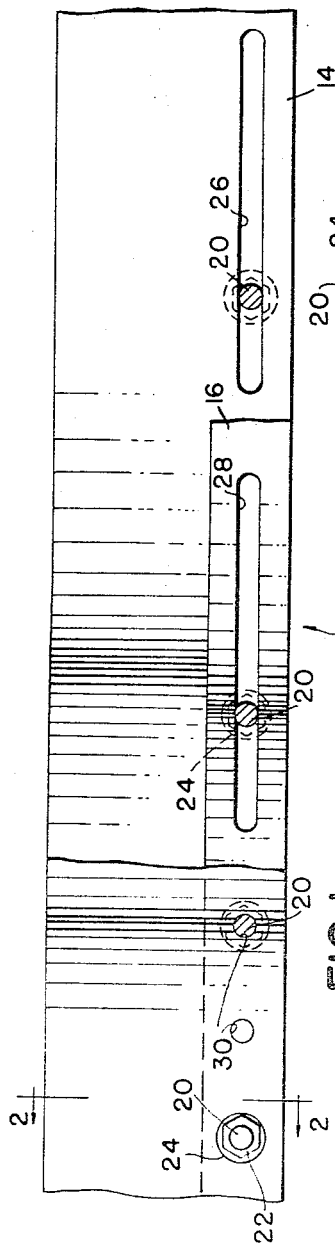
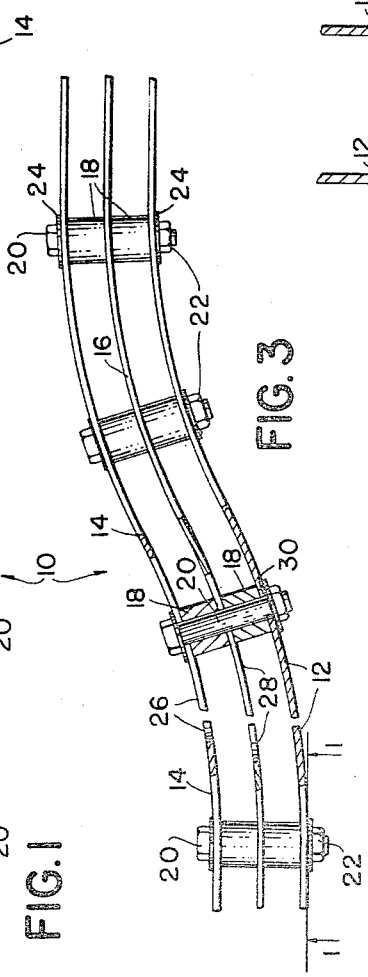
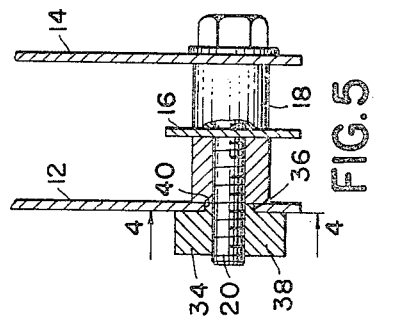
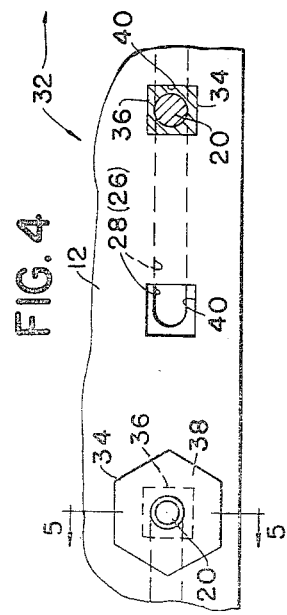
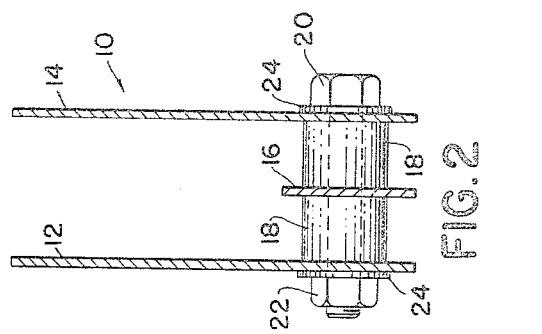
INVENTOR.
RUSSELL H. MAYER JR.
BY *Whittemore Hulbert*
*Belknap*
ATTORNEYS United States Patent Office 3,370,683
Patented Feb. 27, 1968

3,370,683
FLEXIBLE CHUTING
Russell H. Mayer, Jr., Clawson, Mich., assignor to United Industrial Engineering Corporation, Madison, Mich., a corporation of Michigan
Filed Jan. 26, 1966, Ser. No. 523,051
2 Claims. (Cl. 193—25)

ABSTRACT OF THE DISCLOSURE

Flexible chuting for guiding rolling objects is shown, in which there are at least three upright track rails of a flexible material disposed in parallel, transversely spaced relation to one another. Two of these have elongated, transversely aligned slots receiving holding bolts, which also are received in non-elongated openings of the third, thus enabling an improved adjustably clamped set-up of the chuting rails in curvilinear outlines of one sort or another.

---

The present invention relates to improvements in flexible chuting, such as is employed industrially in various sorts of gravitational conveyor track structures and the like, for example, for the supply of cylindrical or other cross-sectioned workpieces, for the removal thereof following an operation, etc.

It is an object of the invention to provide improved conveyor track chuting of this sort which incorporates means enabling it to be flexibly contoured in a large number of outlines, to suit the special requirements of a track system, and then to be fixedly and rigidly clamped in a stable fashion to prevent displacement of any of its component rail elements from the desired relationship.

More specifically, it is an object of the invention to provide track or like chuting of a flexible nature which is made up of a pair of outer side restraining rails, usually upright in disposition, and one or more intermediate or medial load supporting or bearing rails, together with appropriate spacing and holding provisions whereby these rails may be readily flexed into a desired contour, being in parallel, laterally spaced relation to one another, then locked securely in an improved manner, as compared with other, generally comparable chute arrangements.

Thus, in accordance with the invention, one of the side rails and an intermediate bearing or load supporting rail are provided, between upper and lower edges thereof, with elongated, substantially coplanar slots adapted for the transverse reception of locking or holding bolts; while the other upright side rail is apertured in a different way for coaction with the first named rails and the holding bolts.

That is, rather than being provided with elongated slots, the side rail in question has a plurality of longitudinally spaced, relatively small-sized openings therethrough in the same general plane as the slots of the other rails. Such openings also receive the transverse holding bolts, with spacer sleeves between the rails through which the bolts extend. Accordingly, the elongated bolt slots permit any desired flexure of both the side and the intermediate rails, with resultant possible shifting of the slots of certain thereof out of transverse alignment with one another; yet the restricted size openings of one of the side rails are adapted to receive a bolt with very slight circumferential clearance, as distinguished from the extended longitudinal or end clearance afforded by the slots of the other rails. This affords stability, due to the fact that one side rail is restricted from longitudinal movement relative to the bolt in question; and accordingly, there is a greater resistance against displacing shift of the chute rail structure as a whole, once the holding bolts have been tightened by nuts threaded thereon from the exterior.

In accordance with the invention, the shift-restraining action may be exerted by standard bolts and nuts, the bolt shanks extending with close circumferential clearance through circular openings through one of the side rails, there being a number of relatively closely spaced such openings along that rail.

In another embodiment, the openings in question are non-circular in outline, more particularly square; and the holding nuts are special ones having correspondingly square formations snugly received in the openings, thus to prevent any degree of relative shift of the bolt, nut and rail in the longitudinal direction.

The foregoing as well as other objects will become more apparent as this description proceeds, especially when considered in connection with the accompanying drawing illustrating the invention, wherein:

FIG. 1 is a fragmentary view in side elevation of the improved chuting of the invention, being progressively broken away along a portion of its length and vertically sectioned along a line corresponding to line 1—1 of FIG. 3;

FIG. 2 is an enlarged scale view in transverse vertical section on line 2—2 of FIG. 1;

FIG. 3 is a fragmentary top plan view, partially broken away and in horizontal cross section on a central plane through the bolt-receiving slots and openings or holes in the side and intermediate rails of the chute structure;

FIG. 4 is a fragmentary view in side elevation corresponding to FIG. 1, but showing an alternative adaptation in which the openings of one of the side rails are square in shape, this view also being in part vertically sectioned similar to FIG. 1, or along line 4—4 of FIG. 5; and FIG. 5 is a fragmentary view in vertical transverse section on line 5—5 of FIG. 4.

The improved chuting of the invention, in one embodiment or adaptation thereof illustrated in FIGS. 1, 2 and 3, is generally designated by the reference numeral 10. Typically of chute structures of the same general type, the chuting 10 comprises a pair of laterally spaced, parallel side walls or rails 12, 14, respectively, and one or more load supporting or bearing rail 16 therebetween, which is of substantially lesser vertical extent than side rails 12, 14. Tubular sleeve spacers 18 on either side of rail 16 rigidly separate the latter from the side rails, and provide a rigid block-like brace for the structure 10, as assembled with the securing bolts 20 in a manner to be described. Bolts 20 receive hex nuts 22, with washers 24 interposed between the bolt head and nut and side rails 12, 14, as shown in FIG. 2.

In accordance with the invention, one of the side rails, i.e., rail 14, is provided with a plurality of considerably elongated horizontal slots 26 paralleling and adjacent its bottom (FIG. 1); and the intermediate load supporting or bearing rail 16 is also formed with a plurality of similarly elongated slots 28 which are coplanar with side rail slots 26.

In each case, the slots 26 of rail 14 and the slots 28 of rail 16 are in an end-to-end spacing from one another substantially less than their respective lengths. Accordingly, the rails 14, 16, together with the second side rail 12, may be flexibly contoured arcuately as desired (FIG. 3) in a wide variety of curved outlines but the rail slots 26 and 28 will in any instance partially overlap one another longitudinally, thus enabling the transverse insertion of a locking bolt 20 through both sets of slots.

By contrast, the side rail 12 is provided, at rather short longitudinally spaced intervals along its lower portion, and in the horizontal plane of slots 26, 28, with circular through holes or openings 30. These are of a diameter to receive the threaded shank of a bolt 20 with only small clearance; and a suitable number of bolts (not necessarily one for each hole 30) are employed to obtain a firm lock-up of rails 12, 14 and 16.

With the nuts 22 taken up, the bolts 20 in effect locally anchor the longitudinally slotted rails 14 and 16, at a considerable number of points, to the rail 12, rather than at three bolt and slot connections at each transverse zone of securement. This affords a higher degree or rigidity and resistance to relative longitudinal shift of rails 14 and 16 than is otherwise had. The chute structure 10 as a whole may be supported in any desired way by side, top and/or bottom mounting or frame means (not shown).

FIGS. 4 and 5 illustrate an alternative embodiment of the chute, generally designated 32, which also includes side rails 12, 14, and an intermediate rail 16, as well as sleeve spacers 18. Rails 14 and 16 are provided with longitudinally spaced, elongated slots, as in the embodiment of FIGS. 1, 2 and 3. A hex-head holding bolt 20 may be employed, as before; but in this case the locking nut 34 therefor is one having a square extension 36 from its head portion 38. The side rail 12 is formed, at longitudinally spaced, rather short intervals, with square through-openings or holes 40, which are shaped to snugly receive the square extension 36 of nut head 38. In assembling the chuting unit 32, the nut 34 will be first placed in mating engagement in the hole 40, then the bolt 20 inserted through rails 12, 14 and 16 and spacers 18 from the opposite side of the structure, being tightly threaded into nuts 34 when the proper contouring of the chuting 32 is laid out.

Here again, the nuts 34 firmly and positively lock bolts 20 and the slotted intermediate and side rails 16 and 14 to the side rail 12, affording a desired stability corresponding to that found in the first described alternative embodiment 10.

What I claim as my invention is:

1. An improvement in chuting of the type having parallel side rails defining side limits of the chuting as a whole, at least one further rail in general parallelism with and between said side rails, means including transverse elements to hold said side and further rails in side-by-side assembly, and spacing means coacting with said elements in so holding the assembly; in accordance with which improvement one of said side rails and said further rail each have an elongated slot substantially paralleling its length between opposed, transversely spaced top and bottom edges thereof, the other side rail having a plurality of longitudinally spaced openings of polygonal cross-section substantially in the plane of said elongated slots but of substantially less longitudinal extent than the latter, one of said transverse elements of said holding means extending through said slots and in said opening in said other side rail, said holding means having a polygonal formation mating in said opening, whereby said means is positively restrained at the opening both rotatively and in the longitudinal direction of the slots.

2. The improvement of claim 1, in which said holding element is an elongated bolt, said holding means further comprising a nut threaded on said bolt, said last named formation being integral on said nut.

References Cited

UNITED STATES PATENTS 289,379   12/1883   Blighton _____ 151—44

ANDRES H. NIELSEN, *Primary Examiner.*